(12) United States Patent
Jiang et al.

(10) Patent No.: US 8,090,165 B2
(45) Date of Patent: Jan. 3, 2012

(54) ULTRASONIC IMAGING SYSTEM AND A METHOD FOR OPTIMIZING THE GRAY LEVEL OF ULTRASONIC IMAGES

(75) Inventors: Yong Jiang, Shenzhen (CN); Qinjun Hu, Shenzhen (CN); Jian Dong, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 1021 days.

(21) Appl. No.: 11/854,634

(22) Filed: Sep. 13, 2007

(65) Prior Publication Data

US 2008/0123986 A1 May 29, 2008

(30) Foreign Application Priority Data

Nov. 29, 2006 (CN) .......................... 2006 1 0163533

(51) Int. Cl.
*G06K 9/00* (2006.01)
*G06K 9/34* (2006.01)
*G06K 9/40* (2006.01)
*A61B 8/00* (2006.01)

(52) U.S. Cl. ........ 382/128; 382/173; 382/254; 382/261; 600/437

(58) Field of Classification Search .................. None
See application file for complete search history.

(56) References Cited

U.S. PATENT DOCUMENTS

| | | | |
|---|---|---|---|
| 5,579,768 A | 12/1996 | Klesenski | |
| 5,743,266 A | 4/1998 | Levene et al. | |
| 5,883,309 A | 3/1999 | Vossiek et al. | |
| 6,151,418 A | 11/2000 | Bleck et al. | |
| 6,733,454 B1 | 5/2004 | Bakircioglu et al. | |
| 6,743,174 B2 | 6/2004 | Ng et al. | |
| 7,604,594 B2 * | 10/2009 | Adams et al. | 600/437 |
| 2004/0102706 A1 | 5/2004 | Christopher et al. | |
| 2006/0030775 A1 | 2/2006 | Adams et al. | |
| 2006/0079778 A1 | 4/2006 | Mo et al. | |

FOREIGN PATENT DOCUMENTS

| | | |
|---|---|---|
| CN | 1608589 | 4/2005 |
| CN | 1608589 A | 4/2005 |
| CN | 1798523 | 7/2006 |
| CN | 1798523 A | 7/2006 |
| JP | 2004350699 | 12/2004 |
| JP | 2004350699 A | 12/2004 |

OTHER PUBLICATIONS

Zhu, Qigang et al., "Remove the Artifact and Histogram Equalization for the Ultrasound Endoscopes Image," College of Information and Electrical Engineering, Shandong University of Science and Technology, Qingdao Shandong, 266510, China, pp. 245-247. Liu, Qingtuan et al., "Contrast enhancement method of medical ultrasonic images based on preserving brightness," Chin J. Med Imaging Technol, 2006, vol. 22, No. 3, pp. 461-463.

* cited by examiner

*Primary Examiner* — Tom Y Lu
*Assistant Examiner* — Thomas Conway
(74) *Attorney, Agent, or Firm* — Kory D. Christensen; Stoel Rives LLP (57) ABSTRACT

The invention relates to an ultrasonic system and a method for optimizing gray level value of ultrasonic images used in the ultrasonic system, the method comprises: an acquiring step for acquiring the ultrasonic image; a searching step for searching non-evenly divided sub-areas from the acquired ultrasonic image; analyzing step for analyzing the change of gray level in each of the sub-areas in the direction of depth; and calculating step for calculating an optimized gray level value of the ultrasonic image based on the result of the analyzing step. By implementing the method of present invention, a better image equilibrium effect is obtained in the ultrasonic system.

20 Claims, 12 Drawing Sheets

ULTRASONIC IMAGING SYSTEM AND A METHOD FOR OPTIMIZING THE GRAY LEVEL OF ULTRASONIC IMAGES

TECHNICAL FIELD

The invention relates to an ultrasonic imaging system and a method for optimizing the value of gray-level of the ultrasonic images used in said system.

BACKGROUND ART

Conventionally, in order to get a better quality of an image, when an ultrasonic diagnose is performed by use of B-type ultrasonic imaging technology, an operator of ultrasonic imaging system has to adjust TGC (Time Gain Compensation), Gain (total gain), dynamic range etc. These adjustments result in an elongated time for the diagnosis. This problem is usually solved by a so called "one button for optimizing B type images" technique. The "one button for optimizing B type images (i.e. black and white images)" technique aims to simplify the adjustment of TGC, Gain and dynamic range. The user is only required to press one button, and then the ultrasonic system can automatically analyze the most appropriate TGC, Gain and other parameters related to imaging procedure and make those appropriate parameters valid. Accordingly, a better image is obtained, and the efficiency as well as accuracy of the diagnosis are effectively enhanced. This technique is referred as "one button optimization" or "automatic image equilibrium".

Most of the one button optimization (or automatic image equilibrium) techniques are based on the analysis of the change of gray level value of the image in the direction of depth. An appropriate TGC curve and Gain are calculated based on the analysis. For example, U.S. Pat. Nos. 6,743,174B2, 5,579,768, 6,120,446 and 6,102,859 provide some approaches to implement the technique. There are many different ways to analyze the change of gray-level, and the suppression of noise is also taken into considered in the procedure of the analysis. In particular, U.S. Pat. No. 6,743,174B2 proposes a method to automatically optimize the dynamic range.

In U.S. Pat. No. 6,743,174B2, it is assumed that the gray level is changed evenly and monotonically in the direction of depth, and it can be fitted by a straight line. This assumption is against most of the practical situations. Moreover, since average value and median value of gray level are used in this method to adjust dynamic range, it can not achieve a good result. In the methods proposed by U.S. Pat. Nos. 5,579,768 and 6,102,859, B type images are evenly divided along the radial direction and tangent direction of the probe. The average gray level of each divided area is taken into account in the procedure for analyzing the change of gray level. Consequently, this approach may lead to inaccuracies in the result of the analysis. Besides, since homogeneous soft tissue sub-areas, noise sub-areas and structural tissue sub-areas etc, which indicate different gray levels, are included in the captured B type image, the approach for evenly dividing the sub-area is not appropriate for the analysis of the gray level of whole image.

DISCLOSURE OF THE INVENTION

The object of this application is to provide an ultrasonic imaging system and imaging method for overcoming the above-mentioned drawbacks in conventional arts and obtaining a better effect of image equilibrium.

A method for optimizing the gray level value of ultrasonic images used in ultrasonic system, comprises: an acquiring step for acquiring an ultrasonic image; a searching step for searching non-evenly divided sub-areas from the acquired ultrasonic image; analyzing step for analyzing the change of gray level in each of the sub-area in the direction of depth; and calculating step for calculating an optimized gray level value of the ultrasonic image based on the result of the analyzing step.

The invention also provides an ultrasonic imaging system for optimizing the gray level value of ultrasonic images, comprises: an acquiring device for acquiring an ultrasonic image; a searching device for searching non-evenly divided sub-areas from the acquired ultrasonic image; analyzing device for analyzing the change of gray level in each of the sub-area in the direction of depth; and calculating device for calculating an optimized gray level value of the ultrasonic image based on the result of the analyzing step.

BEST MODE FOR CARRYING OUT THE INVENTION

Figure 1:
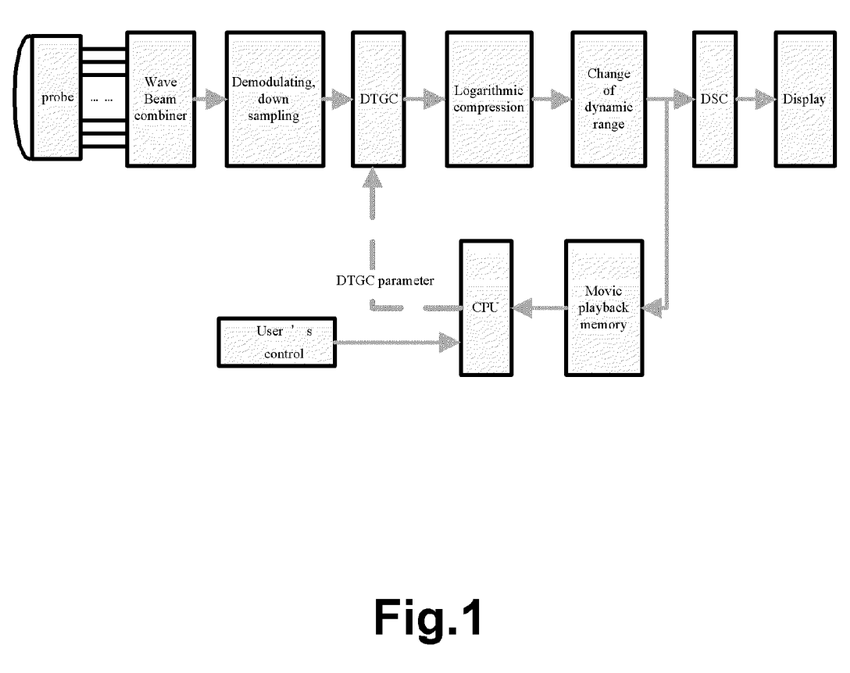
FIG. 1 is a structural block diagram of the ultrasonic imaging system according to the embodiment of the present invention.

FIG. 1 is a structural block diagram of the ultrasonic imaging system for implementing automatic image equilibrium according to the embodiment of the present invention (since the transmitting device does not relate to the present invention, the specific structure thereof are omitted).

According to FIG. 1, an ordinary procedure for obtaining B type images comprises: a pulse is emitted by the probe; the array elements receive the echoes; the received echoes are amplified and subjected to A/D conversion; and the A/D converted echoes are added together with different amount of time delay to obtain RF data. The RF data are subjected to envelop detection, down sampling, DTGC (Digital Time Gain Compensation), logarithmic compression, changing of dynamic range, and then stored into a movie playback memory, such that the user may playback the stored data. The data whose dynamic range has been changed are also input into a DSC (Digital Scanning Conversion) device. The result of DSC, which is a B type image, is displayed on a screen. In the above-mentioned procedure, DTGC imposes different gains to the input data in the direction of depth (i.e. time), which makes the images on the screen have an appearance with uniform brightness. Generally, the user adjusts the potentiometers (generally, there are 6-8 potentiometers, which correspond to gain compensation values for different depth respectively) on the keyboard according to the image on the screen, to make different parts of the image, which correspond to different depths, brighter or darker respectively. The user can also turn the Gain button on the keyboard to make the image brighter or darker as a whole. The CPU reads out the statuses of those potentiometers and Gain button, and converts them into corresponding DTGC parameters (usually, the conversion procedure involves interpolation to the parameters). Then, those resultant DTGC parameters are written into a DTGC module. The DTGC module multiplies the written DTGC parameters with demodulated image data, and performs several processes, such as logarithmic compression, to the compensated image data.

For example, in a practical system, it is assumed that there are 8 potentiometers on the keyboard, they correspond to dtgc_po[i] (wherein, i=0~7) respectively, and the Gain button corresponds to the value of gain. The data of a scan line, which has been subjected to detection and down sampling, are x[k] (wherein, k=0~511). The working procedure of DTGC module is as follows:

(1) The CPU reads dtgc_po[i] of the potentiometers, and perform interpolation to the 8 data elements of dtgc_po[i]. Then, the dtgc_po[i] becomes an array of DTGC1[i] with 128 data elements (wherein, i=0~127).
(2) The CPU reads the gain value of the Gain button, and multiplies or adds DTGC1[i] with the gain value of Gain button based on the predetermined rules in the system. Then, an array of PDM[i] with 128 data elements (wherein, i=0~127) is obtained from the above operation. The values of the PDM are provided to DTGC module. Wherein, the abbreviation of PDM refers to Parameter for DTGC Module.

The DTGC module multiplies the input down sampling result x[k] (wherein, k=0~511) with PDM[i] (wherein, i=0~127). It is assumed that the output data are y[k].

$$y[k]=x[k]*PDM[i], i=[k/\text{delta}];$$

The delta in the above equation indicates that every delta elements in the down sampling results x[k] are multiplied with one PDM. Generally, delta is 4, or it can take any other appropriate numbers.

If the statuses of the potentiometers or Gain button on the keyboard are changed, the above processes of (1) and (2) are repeated.

The ultrasonic imaging system of the invention automatically searches appropriate PDM based on the analysis to the captured ultrasonic images. The obtained appropriate PDM are used to replace those PDM determined by TGC potentiometers and Gain button on keyboard. Referring to FIG. 1, in the case of non-one-key optimization, the CPU calculates PDM based on TGC potentiometers and Gain button on the keyboard in a conventional way, and sends the calculated PDM into DTGC module. In the case of one-key optimization, the CPU reads the image data from the movie playback memory, and analyzes the data by the following procedure. Then, an appropriate PDM is obtained, and it is sent to DTGC module.

Figure 2:
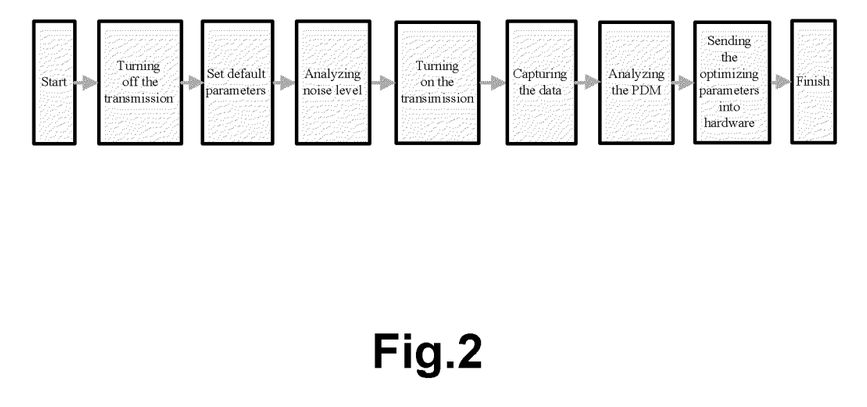
FIG. 2 is a flowchart of the method to optimize gray level value of ultrasonic image in the embodiment of the ultrasonic system according to the present invention.

FIG. 2 is a flowchart of the method to optimize gray level value of ultrasonic image according to the embodiment of the ultrasonic system of the present invention. When the user starts the system employing the method proposed by the present invention, the overall procedure is as follows:

1. Transmission shutting off: the CPU first shuts off the ultrasonic transmission of the probe.
2. Setting default parameters: then, the CPU sets the parameters of the DTGC module and dynamic range changing module as default. In particular, the default parameters of the DTGC module can be set such that the input gain thereof is one. Moreover, the default parameters of the dynamic range changing module can be set such that the input data thereof are mapped to 0~255.
3. Analyzing the noise level: one or more frames of data are read out from the movie playback memory. Since the ultrasonic transmission of the probe is shut off and no echo existed, the data stored in the movie playback memory are just noise data. The captured noise data are hereby analyzed for obtaining the noise level corresponding to different depths in the image.
4. Turning on the transmission: The CPU turns on the ultrasonic transmission of the probe.
5. Capturing the data: one or more frames of data are captured from the movie playback memory. Since the ultrasonic transmission of the probe is turned on, the data stored in movie playback memory are processed data of echo which are reflected from the scanned subject.
6. Obtaining the PDM for automatic image equilibrium: the CPU analyzes the captured data and obtains the PDM. The obtained PDM enables a uniform brightness in the whole imaging field, and the uniform brightness conforms to the user's requirement.
7. Sending the PDM into DTGC module: writing the PDM obtained in the above steps into DTGC module; compensating the captured image data by use of the PDM; and hereby displaying the image, whose brightness has been optimized, on the screen.

Steps 3 and 6 of the above procedure comprise three portions, which are listed as follows:
first, analyzing noise level;
second, analyzing the gray level changing curve of the image; and
third, obtaining the PDM.

The procedures of the above three portions are described in detail thereafter.

I. The Analysis of Noise Level

During the ultrasonic transmission of the probe, the captured one frame noise data can be treated as a two dimensional array NoiseImg[M][N]. Wherein, the M is a number of points in the vertical direction (generally, it is in the range between 360~600); and N is a number of received lines in one frame of image data. The analysis of noise level can be performed as follows:

(1) The noise image is divided into Ver_Num lines. The amount of data in each line is M/Ver_Num*N, and the value of Ver_Num can be set as different values according to the different configurations of probe and examination modes.
(2) The average value of all the data in a line is calculated, and a noise level curve Noise[i] (wherein, i=0~Ver_Num−1) is then obtained. The noise level curve Noise[i] represents the noise level from shallow area to deep area in the image displaying field. The formula to calculate the noise level curve is as follows:

$$\text{Noise}[i] = \text{Mean}(\text{Noise}Img[i*M/\text{Ver\_Num}:(i+1)*M/\text{Ver\_Num}-1][0:N-1])$$

Wherein, the [i*M/Ver_Num: (i+1)*M/Ver_Num−1] [0:N−1] represents the first subscript of the two dimensional array NoiseImg is in the range between i*M/Ver_Num to (i+1)*M/Ver_Num−1, and the second subscript of the two dimensional array NoiseImg is in the range between 0 to N−1.

(3) The above steps (1) and (2) can be repeated when several frames of noise image are captured. Then, the average value of the noise level curve Noise[i] corresponding to each frame of noise image is calculated, and a final noise level curve Noise[i] is thereby obtained.

II. Analysis of Gray Level Changing Curve

Figure 3:
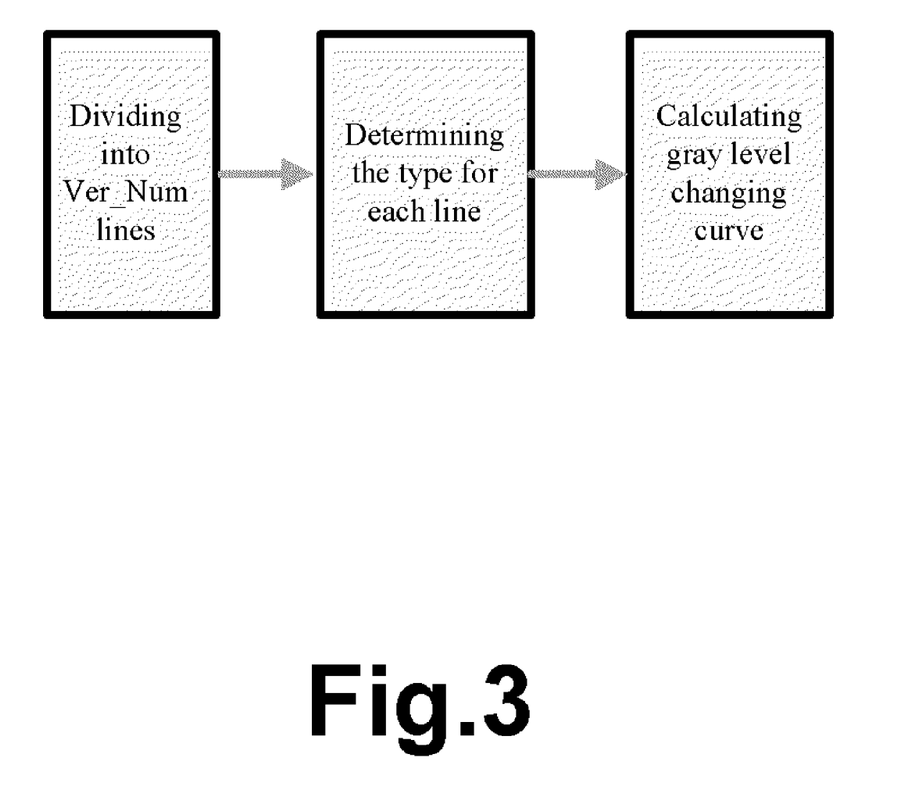
FIG. 3 is a flowchart for analyzing the change of gray level according to the embodiment of the ultrasonic system of the present invention.

FIG. 3 is a flowchart for analyzing the change of gray level. The processed image data of echo, which are reflected by the scanned subject, is defined as a two dimensional array Image [M][N] after the CPU turns on the ultrasonic transmission of the probe. Wherein, the image data are read out from the movie playback memory. The M is a number of points in the vertical direction of the image (generally, it is in the range between 360~600); and N is a number of received lines in one frame of image data. The analysis procedure is illustrated as follows:

1. The image is evenly divided into Ver_Num lines, the data amount of each line is M/Ver_Num*N, and the value of Ver_Num can be set as different values according to the different configurations of probe and detection modes. It should be note that, the number of lines of the processed image data of echo, which is reflected by the scanned subject, should be the same as that of the noise image.

2. The type of each line is then determined, which is an important step in the algorithm. We think it may contain three types: the first type, most parts of the scanned subject are homogeneous soft tissue, which is referred to as valid line; the second type, most parts of the scanned subject are the edge of tissue, which is referred to as structural line; the third type, most parts of the scanned subject are noise, which is referred to as noise line. The method to determine the type of the lines is as follows:

(a) The size of a sub-area in the line is set as H*W (wherein, H indicates the number of points in the vertical direction, and W indicates the number of points in the horizontal direction). The size thereof can be set as different values according to the different configurations of the probe and detection modes. The value of H should be not more than M/Ver_Num. That is, the size of sub-area in the line is not more than the size of the line. In this embodiment, the value of H is set as M/Ver_Num for simplicity.

(b) The sub-areas representing soft tissues are searched in a line. The positions of these sub-areas can be disposed unevenly. With respect to the $i^{th}$ line, the searching method is illustrated as follows:

(i) The sub-areas representing homogeneous soft tissues are searched from the beginning of the line. A array SubImg[m][n] is used to represent the elements in the sub-areas. Wherein, m is in the range between (i−1)*M/Ver_Num to i*M/Ver_Num−1, and n is in the range between startP to startP+W−1. With respect to the start point of a line, startP is set as 0. The searched sub-area is determined as a soft tissue area when the three following conditions are met: first, the average gray level value in the sub-area is larger than A times of the noise level Noise[i] in the same line (Wherein, the value of A can be set as different values according to the different configurations of probe and detection modes. Generally, A is set as 1.1.); second, the variance of the value of gray level in the sub-area is less than a predetermined variance; and the third, the average value of the gray level in the sub-area is less than B times of the largest gray level value in the whole image (wherein, the value of B can be set as different values according to the different configurations of probe and detection modes. Generally, B is set as 0.8.). A sub-area is determined as a noise sub-area when the average value of gray level is less than the A times of noise level Noise[i] in the same line. A sub-area is determined as a structural area when it is determined as neither a homogeneous soft tissue area nor a noise area.

(ii) The current sub-area is changed to be the next to-be-determined sub-area when the current sub-area is determined as a homogeneous soft tissue area or a noise area. That is, the startP is set as startP+W (which is equivalent to changing the current sub-area in one dimensional direction). The step (i) is repeated for determining the next sub-area. The next sub-area which has just been processed is changed to be a further next sub-area, if the next sub-area is determined as a structural sub-area. Wherein, the startP is set as startP+deltaW. The deltaW is a number less than W. Generally, it can be set as W/2 or W/3 (it can be set as other values depending on the different configurations of probe and detection modes). Step (i) is repeated for determining the type of the further next sub-area. Generally, since the average value of gray level of structural area is significantly larger than that of homogeneous soft tissue area, a misjudgment to the average gray level of a whole line would occur if the structural area and homogeneous soft tissue area were evenly disposed in the line. By virtue of said unevenly arrangement, the searching method proposed by the present invention can effectively avoid the influence, which is imposed by the structural area, upon the calculation of the average gray level of a whole line. It is also possible to utilize all the homogeneous soft tissue areas to the greatest extent by use of said searching method. On the contrary, it is very difficult for the approach of evenly dividing sub-areas to achieve such an effect.

Figure 4:
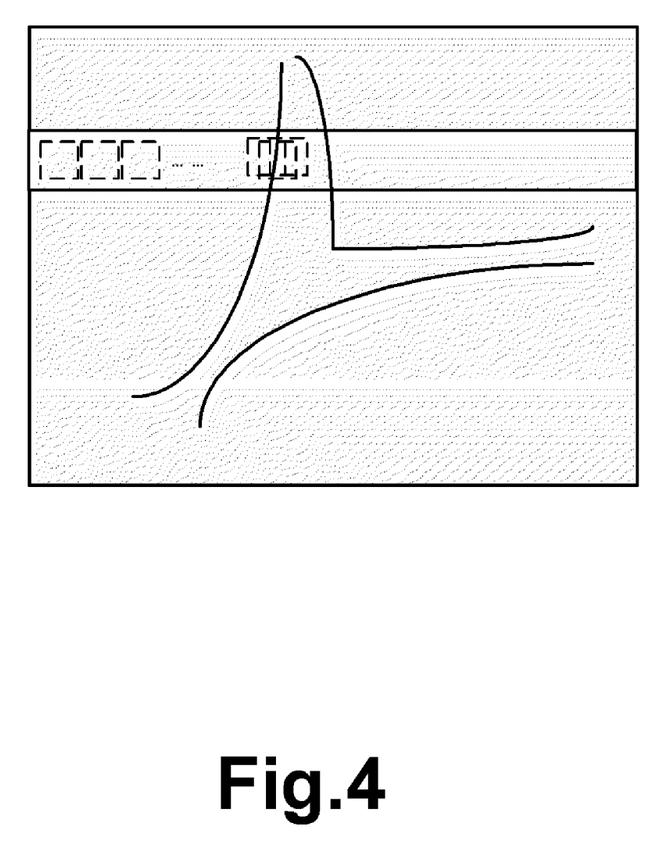
FIG. 4 is an illustrative scheme for a method for changing the sub-areas according to the embodiment of the ultrasonic system of the present invention.

FIG. 4 is an illustrative scheme for changing the sub-areas in the homogeneous soft tissue areas and structural areas. According to FIG. 4, in the ultrasonic image, the moving length for homogeneous soft tissue sub-areas is larger than that of the structural sub-areas.

Figure 5:
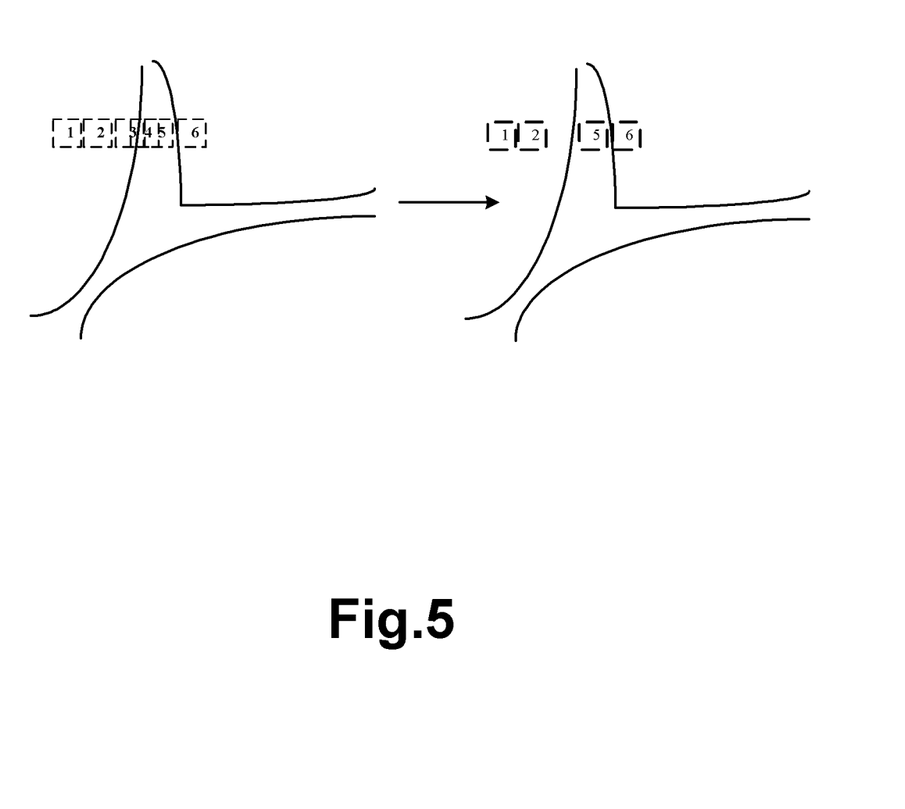
FIG. 5 is a scheme diagram for illustrating the sub-area searching process.
Figure 6:
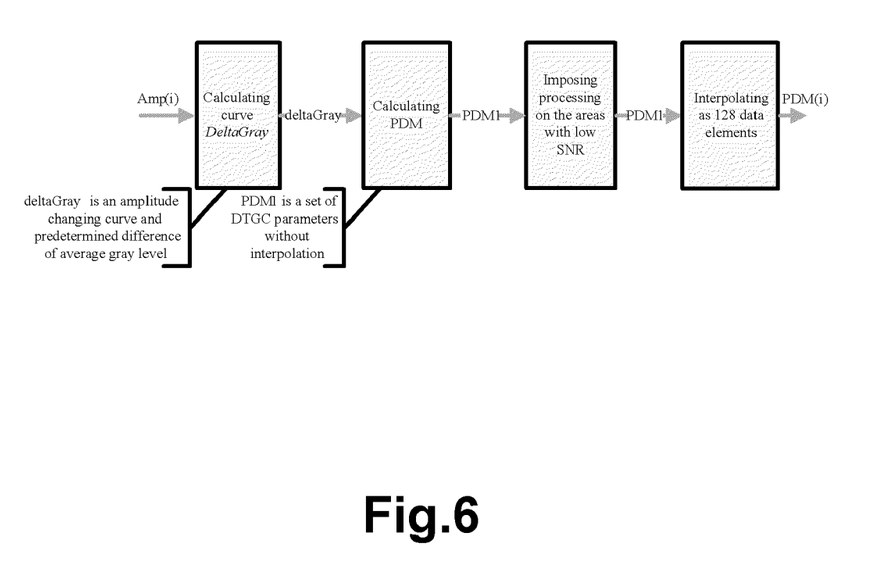
FIG. 6 is a flowchart for calculating the image equilibrium parameters according to the embodiment of the present invention.

FIG. 5 further illustrates the searching process. Wherein, it is determined that sub-area 1 is a homogeneous soft tissue sub-area, then the sub-area 1 moves W to the right, and the next sub-area is referred as 2; it is determined that sub-area 2 is a homogeneous soft tissue sub-area, then the sub-area 2 moves W to the right, and the next sub-area is referred as 3; it is determined that sub-area 3 is a structural sub-area, then the sub-area 3 moves deltaW to the right, and the next sub-area is referred as 4; it is determined that sub-area 4 is a structural sub-area, then the sub-area 4 moves deltaW to the right, and the next sub-area is referred as 5; it is determined that sub-area 5 is a non-structural sub-area, then the sub-area 5 moves W to the right, and the next sub-area is referred as 6. As a result, the structural areas 3 and 4 are discarded. Consequently, the sub-areas 1, 2, 5, and 6, which are the result of the sub-areas division, are unevenly disposed in the image.

(iii) According to the method in step (ii), the sub-area is changed from left to right until the rightmost of the image. Two counters are provided for counting the number of homogeneous soft tissue sub-areas and the number of noise sub-areas respectively. It should be noted that, the size of the sub-area can be reduced for changing a sub-area two dimensionally inside the line in order to search homogeneous soft tissue sub-areas. This arrangement can achieve better results.

(iv) Two thresholds T_Tis and T_Noise are preset for the numbers of homogeneous soft tissue sub-areas and noise sub-areas respectively. A line is determined as a valid line (most of the sub-areas in the line are homogeneous soft tissue sub-areas) when the number of homogeneous soft tissue sub-areas therein is larger than T_Tis, and this valid line can be used to analyze the gray level of the image. A line is determined as a noise line when the number of noise sub-areas therein is larger than T_Noise. If neither of the above two conditions are met, the line is determined as a structural line. The lines determined as noise line and structural line cannot be used to analyze the gray level of the image. The thresholds of T_Tis and T_Noise can be set as different values depending on the different configurations of probe and detection modes (such as, the value of W).

(c) Step (b) is repeated for all of the Ver_Num lines divided from the whole image frame, and the type of each line is thereby obtained. Consequently, it can be determined that which lines can be used to perform the gray level analysis of the image, and which lines can not.

2. The gray level Amp[i] (wherein, i=0~Ver_Num-1) for each line is hereby calculated. With respect to those valid lines, the value of gray level is the average value of gray level for all of the homogeneous soft tissue sub-areas. With respect to other lines (i.e. noise lines and structural sub-area lines), their gray level values are interpolated from the gray level values of adjacent valid lines. The gray level values for the valid lines being closest to the other lines are used to perform interpolation in the case of the noise lines and structural sub-area lines are not sandwiched between two valid lines. The gray level changing curve Amp[i] for the whole frame is obtained by calculating the gray level value for each line.

3. In the case of several frames of image data are available for analyzing, the above procedures 1 and 2 are repeated for the image data of other frames. The corresponding gray level changing curve is calculated for each frame, and the average of all the gray level changing curves is calculated for obtaining a final gray level changing curve Amp[i] (wherein, i=0~Ver_Num-1).

III. Calculation of Image Equilibrium Parameters PDM

In addition to making all the tissues in the imaging field to have a uniform brightness (i.e. gray level), the image equilibrium also makes the brightness and ideal average value of gray level close to the MeanGray curve which indicates the change of average value of gray level (wherein, the MeanGray curve can be preset in the system). In the case of non-one-button optimization, the user can achieve this equilibrium effect by adjusting Gain button to change the gain of the image. Therefore, in the procedure of calculating the PDM, in addition to the image equilibrium, the overall brightness of the image should be adjusted close to the MeanGray curve.

FIG. 5 is a flowchart for analyzing PDM according to the gray level changing curve. The procedure thereof is described thereafter.

1. First, the difference of gray level changing curve Amp[i] and the average gray level changing curve MeanGray, which is referred to as deltaGray, is calculated. The formula for calculating deltaGray is as follows:

$$\text{deltaGray}(i) = \text{MeanGray} - Amp(i) \quad i=0 \sim Ver\_Num \qquad (1)$$

It is obviously that, the MeanGray equals to the sum of Amp(i) and deltaGray(i). The PDM is used to multiply with the original data which have been subjected to detection. Then the resultant multiplied data are logarithmically compressed, and dynamic range thereof is altered. Then, the gray level of the data that underwent all the above processes has a gray level difference of deltaGray(i) in comparison with that of original data. That is, after the gain compensation by use of PDM, the gray level changing curve of the original data is similar to the curve of MeanGray.

2. The data stored in movie playback memory is obtained by imposing DTGC processing, logarithmic compression, and dynamic range changing processing on the captured data. According to the modules depicted in FIG. 1, the DTGC processing is executed before the logarithmic compression and dynamic range changing processing. Therefore, by imposing inverse dynamic range changing processing and inverse logarithmic compression on the deltaGray, which is obtained through the above illustrated procedure, an array of PDM1[i] (wherein, i=0~Ver_Num-1) is obtained. The PDM1[i] represents the compensation parameter which makes the gray level changing curve Amp(i) of the captured image data close to the curve of Mean-Gray. After the multiplication of demodulated image data with PDM1[i], which corresponds to the image data in terms of depth, the logarithmic compression and dynamic range changing processing are performed. As a result of the processing, the distribution of the gray level of soft tissue areas of image is close to MeanGray.

3. With respect to the noise lines determined in the procedure for calculating gray level changing curve, the data therein should be suppressed. In the case of $j^{th}$ line is a noise line, and the most adjacent valid line is the $i^{th}$ line, a formula for calculating the PDM1[i] is illustrated as follows:

$$PDM1(j) = PDM1(i)/(1 + Sup\_K * abs(i-j)) \qquad (2)$$

Wherein, Sup_K is a number larger than 0, which is referred to as gray level suppression coefficient. The value of the coefficient can be set as different values depending on different configurations of probe and detection modes. By use of the above suppression processes, the values of the PDM corresponding to noise lines are smaller than those corresponding to valid lines. Consequently, the noise in the image, whose gain is compensated by PDM, is fully suppressed.

In the case of there are two most adjacent lines with respect to the invalid line to-be-suppressed, the PDM1(i) in equation (2) can be replaced by the average of two PDM1(i)s corresponding to the most adjacent two valid lines.

The DTGC data array obtained in the above steps 1, 2 and 3 (i.e. PDMi[i]) has Ver_Num data elements. Generally, the number of parameters used in the DTGC module may be different from Ver_Num. The PDM1 can be interpolated to obtain the number of data elements required by DTGC module by interpolating operation. As a result of the interpolation, the PDM parameters required by DTGC module are provided.

An approach for analyzing gray level curve is proposed in the above embodiments of the present invention, wherein, a method for dynamically searching homogeneous soft tissue sub-areas is employed. Moreover, the difference and variance of noise level as well as the difference of maximum brightness are taken into consideration when the types of sub-areas are determined. The image is divided into a plurality of lines. The type of each line is determined as one of the following three types: the majority in the line is homogeneous soft tissue, the majority therein is structural area, and the majority therein is noise area. That is to say, the homogeneous soft tissue sub-area is searched dynamically, and then the type of a line comprising the sub-area is determined. Subsequently, a gray level changing curve is calculated based on the result of these processes. By employing such an approach, it is advantageous in terms of analyzing the gray level changing curve. The embodiments of the present application also propose a method to analyze how the DTGC module utilizing PDM parameters based on the gray level changing curve.

Compared with those methods in prior arts, the method proposed in present application adopts an approach for dynamically searching homogeneous soft tissue sub-area. Moreover, in addition to average value of gray level, the relationship between noise level and maximum gray level, the variance of gray level are also taken into consideration in the process for determining the types of sub-areas. By virtue of this approach, the influence of noise areas and structural areas upon gray level changing curve are effectively avoided. Consequently, the value of PDM is much more appropriate, and the image has a better effect of equilibrium.

The embodiments of present invention proposes a method to calculate the time gain compensation (TGC) parameter PDM based on an approach for rationally analyzing the changing gray level in an image. The proposed method adopts an approach for dynamically dividing the sub-areas of an image. The brightness and variance of the image are used to select the sub-areas representing homogeneous soft tissue in different depths (the sub-areas involved therein may have different pitches in horizontal or vertical positions). The change of gray level of those sub-areas representing homogeneous soft tissue in the direction of depth is then analyzed. A TGC parameter which renders equilibrium in the whole imaging field is then calculated based on the result of the above analysis process. The areas mainly composed of noise are found out in the process and being suppressed in the procedure for calculating TGC.

The embodiments of present invention adopt a method for dynamically searching the homogeneous soft tissue sub-areas. The difference and variance of noise level as well as the difference of maximum brightness are taken into consideration when the types of sub-areas are determined. The image is divided into a plurality of lines. The type of each line is determined as one of following three types: the majority in the line is homogeneous soft tissue, the majority therein is structural area, and the majority therein is noise area. In the procedure of analyzing gray level changing curve, only the lines with majority of homogeneous soft tissue sub-areas therein are involved, and the lines with majority of noise therein are suppressed. Compared with conventional approaches, the method in present invention can analyze the gray level changing curve more accurately. Consequently, a better result of image equilibrium is obtained.

In the above descriptions, the process for searching homogeneous soft tissue sub-areas in one line is performed one dimensionally. However, the searching process of present invention can be performed in two dimensions for a more accurate result. Moreover, the inventive concept of the present invention may be applied to three dimensional or four dimensional ultrasonic imaging for dynamically searching the blocks belonging to homogeneous soft tissue. The gray level distribution of the three dimensional or four dimensional spaces are then determined for realizing the equilibrium in three dimensional or four dimensional images.

Figure 7:
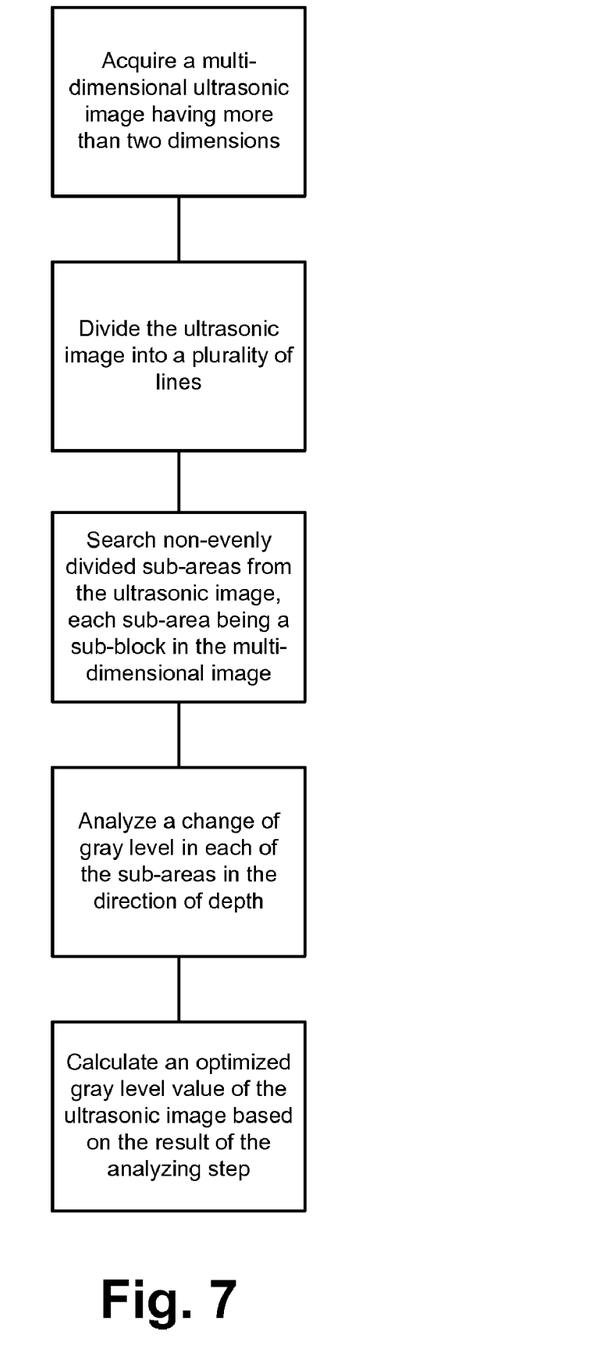
FIG. 7 illustrates a method for optimizing gray level value of ultrasonic images used in an ultrasonic system consistent with embodiments of the present disclosure.

FIG. 7 illustrates a method for optimizing gray level value of ultrasonic images used in an ultrasonic system consistent with embodiments of the present disclosure. As illustrated, the method includes acquiring an ultrasonic image, dividing the ultrasonic image into a plurality of lines, searching non-evenly divided sub-areas from the ultrasonic image, analyzing a change of gray level in each of the sub-areas in the direction of depth, and calculating an optimized gray level value of the ultrasonic image based on the result of the analyzing step.

Figure 8:
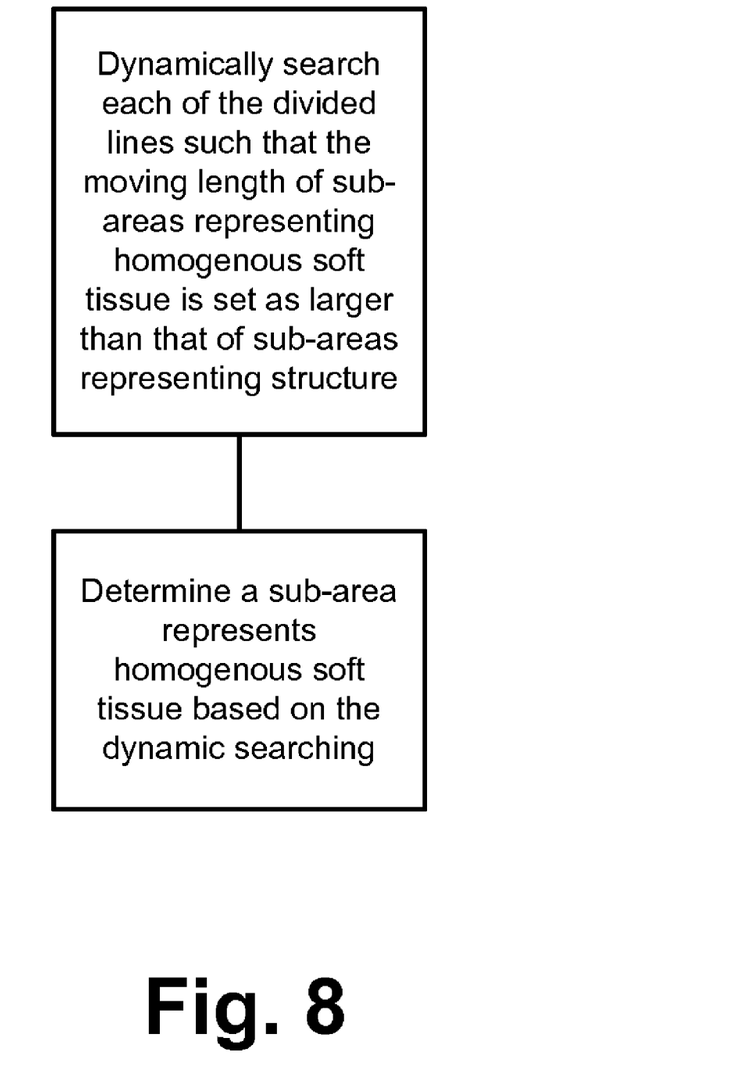
FIG. 8 illustrates a method for searching non-evenly divided sub-areas from an ultrasonic image.

FIG. 8 illustrates a method for searching non-evenly divided sub-areas from an ultrasonic image. As illustrated, a sub-area representing homogeneous soft tissue in the ultrasonic image is determined by dynamically searching in each of the divided lines, wherein the dynamical searching approach corresponds to each of the unevenly divided sub-areas. In certain embodiments, each of the unevenly divided sub-areas is dynamically searched in such a way that moving length of sub-areas representing homogeneous soft tissue in the ultrasonic image is set as larger than that of the sub-areas representing structure in the ultrasonic image in the procedure of searching.

Figure 9:
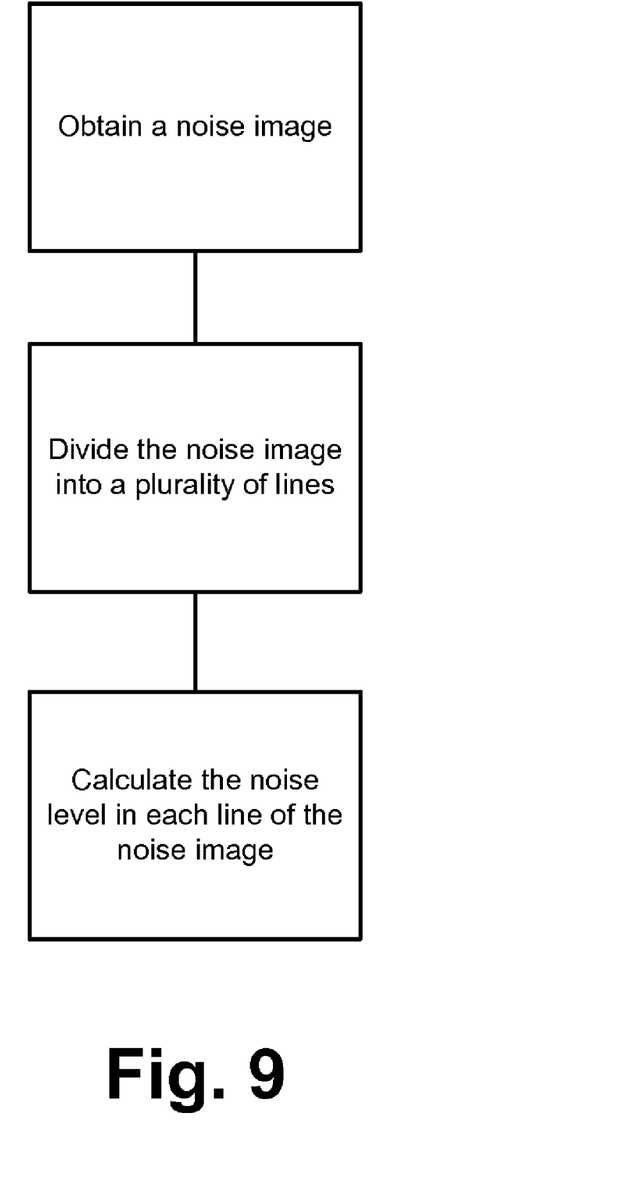
FIG. 9 illustrates a method for calculating noise level in a noise image consistent with embodiments of the present disclosure.

FIG. 9 illustrates a method for calculating noise level in a noise image consistent with embodiments of the present disclosure. As illustrated, the method may include obtaining a noise image, dividing the noise image into a plurality of lines, and calculating the noise level in each line of the noise image.

Figure 10:
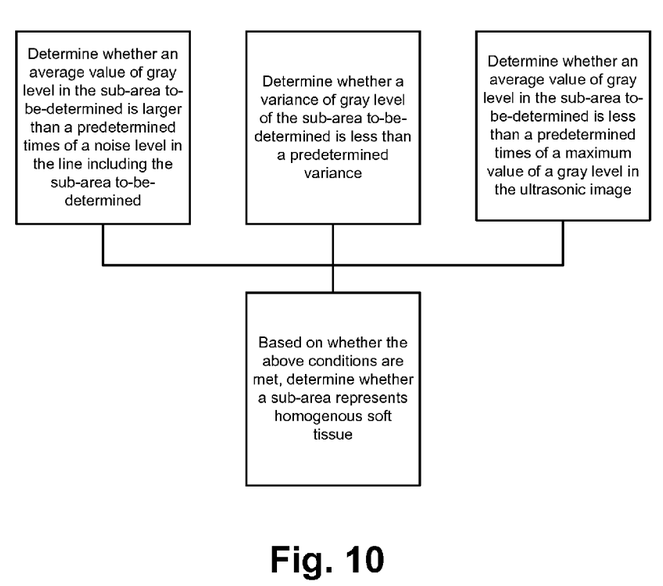
FIG. 10 illustrates a method for dynamic searching consistent with embodiments of the present disclosure.

FIG. 10 illustrates a method for dynamic searching consistent with embodiments of the present disclosure. As illustrated, the method may include determining that a sub-area represents homogeneous soft tissue when the following conditions are met: an average value of gray level in the sub-area to-be-determined is larger than a predetermined times of a noise level in the line including the sub-area to-be-determined, a variance of gray level of the sub-area to-be -determined is less than a predetermined variance, and an average value of gray level in the sub-area to-be-determined is less than a predetermined times of a maximum value of a gray level in the ultrasonic image.

Figure 11:
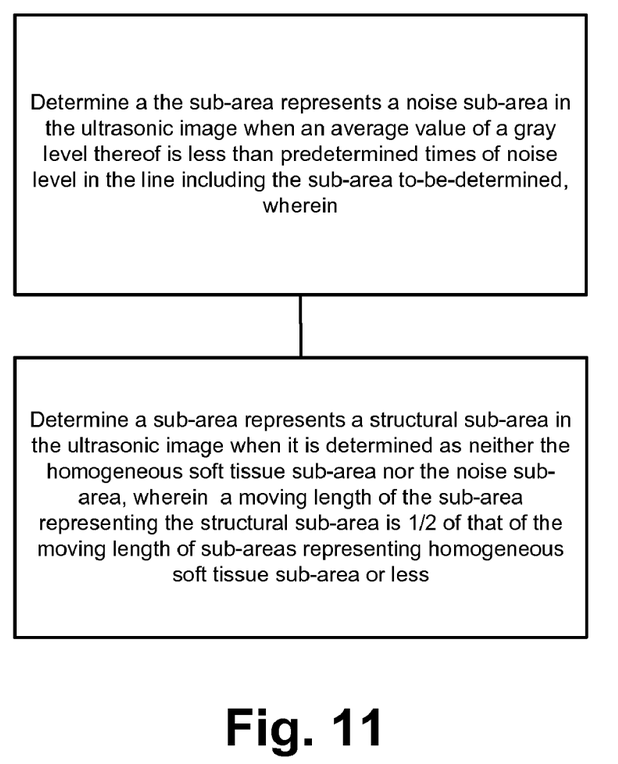
FIG. 11 illustrates a method for dynamic searching consistent with embodiments of the present disclosure.

FIG. 11 illustrates a method for dynamic searching consistent with embodiments of the present disclosure. As illustrated, the method may include determining a the sub-area represents a noise sub-area in the ultrasonic image when an average value of a gray level thereof is less than predetermined times of noise level in the line including the sub-area to-be-determined, and determining a sub-area represents a structural sub-area in the ultrasonic image when it is determined as neither the homogeneous soft tissue sub-area nor the noise sub-area. In certain embodiments, a moving length of the sub-area representing the structural sub-area is ½ of that of the moving length of sub-areas representing homogeneous soft tissue sub-area or less.

Figure 12:
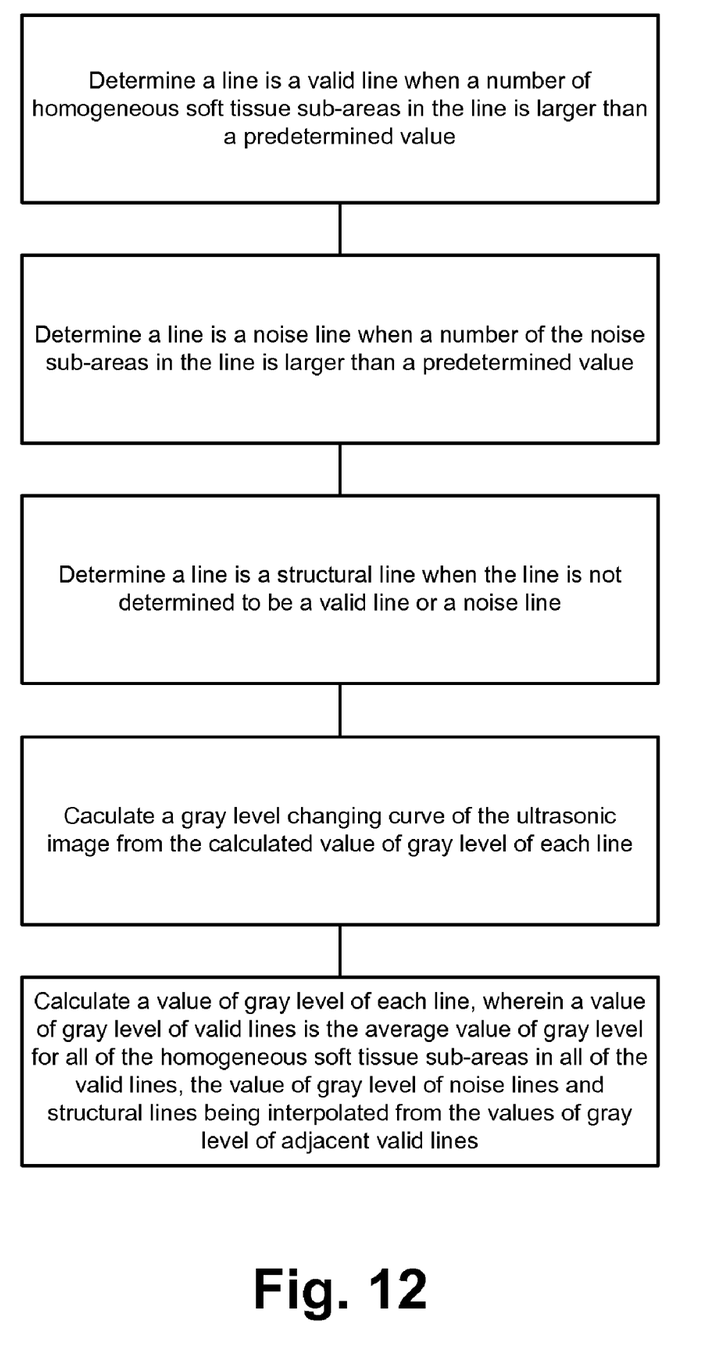
FIG. 12 illustrates a method of analyzing a change of gray level in each of the sub-areas in a direction of depth consistent with embodiments of the present disclosure.

FIG. 12 illustrates a method of analyzing a change of gray level in each of the sub-areas in a direction of depth consistent with embodiments of the present disclosure. The method may include determining a line is a valid line when a number of homogeneous soft tissue sub-areas in the line is larger than a predetermined value, determining a line is a noise line when a number of the noise sub-areas in the line is larger than a predetermined value, determining a line is a structural line when the line is not determined to be a valid line or a noise line, calculating a value of gray level of each line, wherein a value of gray level of valid lines is the average value of gray level for all of the homogeneous soft tissue sub-areas in all of the valid lines, the value of gray level of noise lines and structural lines being interpolated from the values of gray level of adjacent valid lines, and calculating a gray level changing curve of the ultrasonic image from the calculated value of gray level of each line.

Moreover, the above mentioned embodiments are implemented by CPU. However, they can be implemented by separate digital signal processor (DSP) or any other digital hardware logic devices.

The invention claimed is:

1. A method for optimizing gray level value of ultrasonic images used in an ultrasonic system comprising:
   acquiring an ultrasonic image;
   dividing the ultrasonic image into a plurality of lines, each line comprising one or more non-evenly disposed sub-areas, wherein at least some of the non-evenly disposed sub-areas overlap at least in part;
   searching the non-evenly disposed sub-areas from the ultrasonic image;
   analyzing a change of gray level in each of the sub-areas in a direction of depth; and
   calculating an optimized gray level value of the ultrasonic image based on the result of the analyzing step.

2. The method according to claim 1, wherein, the ultrasonic image is a multi-dimensional image which has more than two dimensions, and the sub-area is a sub-block in the multi-dimensional image.

3. The method according to claim 1, wherein the searching comprises:
   determining a sub-area representing homogeneous soft tissue in the ultrasonic image by dynamically searching in each of the plurality of lines, wherein the dynamic searching is performed for each of the non-evenly disposed sub-areas.

4. The method according to claim 3, wherein each of the non-evenly disposed sub-areas is dynamically searched such that a searched length of sub-areas representing homogeneous soft tissue in the ultrasonic image is set as larger than that of the non-evenly disposed sub-areas not representing homogeneous soft tissue.

5. The method according to claims 1 further comprising:
   obtaining a noise image, dividing the noise image into a plurality of lines and calculating the noise level in each line of the noise image.

6. The method according to claim 5, wherein the dynamic searching comprises:
   determining a sub-area represents homogeneous soft tissue when the following conditions are met:
   an average value of gray level in a non-evenly disposed sub-area is larger than a predetermined multiple-of a noise level in a line including the non-evenly disposed sub-area;
   a variance of gray level of the non-evenly disposed sub-area is less than a predetermined variance; and
   an average value of gray level in the non-evenly disposed sub-area is less than a predetermined multiple of a maximum value of a gray level in the ultrasonic image.

7. The method according to claim 6, wherein the searching comprises:
   determining a sub-area representing a noise sub-area in the ultrasonic image when an average value of a gray level thereof is less than predetermined-multiple of noise level in the line including the sub-area representing the noise-sub area; and
   determining a sub-area representing a structural sub-area in the ultrasonic image when the sub-area representing the structural sub-area is neither a non-homogenous soft tissue sub-area or a noise sub-area.

8. The method according to claim 7, wherein a searched length of the sub-area representing the structural sub-area is ½ of that of the searched length of sub-areas representing homogeneous soft tissue sub-area or less.

9. The method according to claim 7, wherein the analyzing step comprises:
   determining a line of the plurality of lines is a valid line when a number of homogeneous soft tissue sub-areas in the line is larger than a predetermined value;
   determining a line of the plurality of lines is a noise line when a number of the noise sub-areas in the line is larger than a predetermined value; and
   determining a line of the plurality of lines is a structural line when the line is not determined to be a valid line or a noise line;
   calculating a value of gray level of each line of the plurality of lines;
   wherein a value of gray level of valid lines is the average value of gray level for all of the homogeneous soft tissue sub-areas in all of the valid lines, the value of gray level of noise lines and structural lines being interpolated from the values of gray level of adjacent valid lines; and
   calculating a gray level changing curve of the ultrasonic image from the calculated value of gray level of each line of the plurality of lines.

10. The method according to claim 9, wherein the analyzing step further comprises:
    calculating a difference between the calculated gray level changing curve and a predetermined average gray level curve;
    performing inverse dynamic range transformation processing and inverse logarithmic transformation processing on the calculated difference;
    performing gray level suppression processing on data associated with noise lines;
    obtaining a set of gain compensation parameters for the ultrasonic image from performing inverse dynamic range transformation processing and inverse logarithmic transformation processing on the calculated difference; and
    optimizing the gray level changing curve based on the gain compensation parameters.

11. An ultrasonic system for optimizing gray level value of ultrasonic images comprising:
    an acquiring device for acquiring an ultrasonic image;
    a dividing device for dividing the ultrasonic image into a plurality of lines, each line comprising one or more non-evenly disposed sub-areas, wherein at least some of the non-evenly disposed sub-areas overlap at least in part;
    a searching device for searching the non-evenly disposed sub-areas from the ultrasonic image;
    an analyzing device for analyzing a change of gray level in each of the sub-areas in a direction of depth; and
    a calculating device for calculating an optimized value of gray level of the ultrasonic image based on the analysis performed by the analyzing device.

12. The system according to claim 11, wherein,
    the ultrasonic image is a multi-dimensional image which has more than two dimensions, and the sub-area is a sub-block in the multi-dimensional image.

13. The system according to claim 11, wherein the searching device is further configured to:
    determine a sub-area representing homogeneous soft tissue in the ultrasonic image by dynamically searching in each of the plurality of lines, wherein the dynamic searching is performed for to each of the non-evenly disposed sub-areas.

14. The system according to claim 13, wherein each of the non-evenly disposed sub-areas is dynamically searched such that a searched length of sub-areas representing homogeneous soft tissue in the ultrasonic image is set as larger than that of the non-evenly disposed sub-areas not representing homogenous soft tissue.

15. The system according to claim 11, whether the acquiring device is further configured to:
  obtain a noise image, divide the noise image into a plurality of lines and calculate the noise level in each line of the noise image.

16. The system according to claim 15, wherein the searching device is further configured to:
  determine a sub-area represents homogeneous soft tissue when the following conditions are met:
  an average value of gray level in a non-evenly disposed sub-area is larger than a predetermined multiple of a noise level of a line including the non-evenly divided sub-area;
  a variance of gray level of the non-evenly disposed sub-area is less than a predetermined variance; and
  an average value of gray level in the non-evenly disposed sub-area is less than a predetermined multiple of a maximum value of a gray level of the ultrasonic image.

17. The system according to claim 16, wherein the searching device is further configured to:
  determine a sub-area represents a noise sub-area in the ultrasonic image when an average value of a gray level thereof is less than a predetermined multiple of noise level in the line including the sub-area representing the noise sub-area; and
  determine a sub-area represents a structural sub-area in the ultrasonic image when the sub-area representing the structural sub-area is neither a non-homogenous soft tissue sub-area or a noise sub-area.

18. The system according to claim 17, wherein a searched length of the sub-area representing the structural sub-area is ½ of that of the searched length of sub-areas representing homogeneous soft tissue or less.

19. The system according to claim 17, wherein the analyzing device is further configured to:
  determine a line of the plurality of lines is a valid line when the number of the homogeneous soft tissue sub-areas in the line is larger than a predetermined value;
  determine a line of the plurality of lines is a noise line when the number of the noise sub-areas in the line is larger than a predetermined value; and
  determine a line of the plurality of lines is a structural line when the line is not determined to be a valid line or a noise line;
  calculating a value of gray level of each line of the plurality of lines;
  wherein a value of gray level of valid lines is the average value of gray level in all the homogeneous soft tissue sub-areas of all valid lines, the value of gray level of noise lines and structural lines being interpolated from the values of gray level of adjacent valid lines; and
  calculating a gray level changing curve of the ultrasonic image from the calculated gray level value of each line of the plurality of lines.

20. The system according to claim 19, wherein the analyzing device is further configured to:
  calculate a difference between the calculated gray level changing curve and a predetermined average gray level curve;
  perform inverse dynamic range transformation processing and inverse logarithmic transformation processing on the calculated difference;
  perform gray level suppression processing on data associated with noise lines;
  obtain a set of gain compensation parameters from performing inverse dynamic range transformation processing and inverse logarithmic transformation processing on the calculated difference; and
  the calculating device is further configured to:
  optimize the gray level changing curve based on gain compensation parameters.

* * * * *